(12) United States Patent
Crank et al.

(10) Patent No.: US 8,365,792 B2
(45) Date of Patent: Feb. 5, 2013

(54) APPARATUS FOR CONFORMING A LABEL

(75) Inventors: Douglas Crank, Holland, MI (US);
Mary Crank, legal representative,
Holland, MI (US); Clinton L. Allen,
Medina, OH (US); William F. Meyers,
Hamilton, MI (US)

(73) Assignee: The Sherwin-Williams Company,
Cleveland, OH (US)

( * ) Notice: Subject to any disclaimer, the term of this patent is extended or adjusted under 35 U.S.C. 154(b) by 285 days.

(21) Appl. No.: 12/847,166

(22) Filed: Jul. 30, 2010

(65) Prior Publication Data
US 2011/0120657 A1 May 26, 2011

Related U.S. Application Data

(63) Continuation of application No. 11/668,250, filed on Jan. 29, 2007, now abandoned.

(60) Provisional application No. 60/762,854, filed on Jan. 27, 2006.

(51) Int. Cl.
*B65C 9/02* (2006.01)
*B65C 9/04* (2006.01)
*B65C 9/36* (2006.01)

(52) U.S. Cl. ........ 156/446; 156/448; 156/449; 156/445; 156/538; 156/540

(58) Field of Classification Search .................. 156/212, 156/446, 448, 449, 455, 538, 540, DIG. 25, 156/DIG. 8–DIG. 11, DIG. 42
See application file for complete search history.

(56) References Cited

U.S. PATENT DOCUMENTS

| 2,524,945 A | 10/1950 | Hofe |
| 3,516,363 A | 6/1970 | Van Der Wal |
| 3,859,155 A | 1/1975 | Dullinger |
| 4,108,709 A | 8/1978 | Hoffmann |
| 4,108,710 A | 8/1978 | Hoffmann |
| 4,108,711 A | 8/1978 | Hoffmann |
| 4,181,555 A | 1/1980 | Hoffmann |
| 4,242,167 A | 12/1980 | Hoffmann |
| 4,336,095 A | 6/1982 | Hoffmann |
| 4,406,721 A | 9/1983 | Hoffmann |

(Continued)

FOREIGN PATENT DOCUMENTS
JP 2003080645 3/2003

OTHER PUBLICATIONS

Corresponding Canadian Application Serial No. 2,534,166; Office Action dated Feb. 15, 2012 (3 pages).

(Continued)

*Primary Examiner* — Christopher Schatz
(74) *Attorney, Agent, or Firm* — Benesch Friedlander Coplan & Aronoff LLP; Arthi K. Tirey; Robert E. McDonald

(57) ABSTRACT

An apparatus and method are provided for conforming a label to the contour of a container. The apparatus includes a conveyor configured to move the container along a travel path, a heat source positioned along the conveyor and configured to heat at least a portion of the label to a sufficient temperature to achieve a sufficient degree of plasticity as the container moves along the travel path, and a mechanical pressure applicator positioned along the conveyor downstream from the heat source. The mechanical pressure applicator is configured to apply pressure to at least a portion of the heated label to conform it to the contour of the container as the container moves along the travel path. The method includes heating at least a portion of the label to a sufficient temperature to achieve a sufficient degree of plasticity, and applying mechanical pressure to at least a portion of the heated label to conform it to the contour of the container.

20 Claims, 8 Drawing Sheets

U.S. PATENT DOCUMENTS

| | | |
|---|---|---|
| 4,416,714 A | 11/1983 | Hoffmann |
| 4,545,832 A | 10/1985 | Hoffmann |
| 4,552,608 A | 11/1985 | Hoffmann et al. |
| 4,704,173 A | 11/1987 | Hoffman |
| 4,729,811 A * | 3/1988 | DiFrank .................. 156/449 |
| 4,844,957 A | 7/1989 | Hoffman |
| 4,872,931 A | 10/1989 | Mitchell |
| 4,923,557 A | 5/1990 | Dickey |
| 4,977,002 A | 12/1990 | Hoffman |
| 5,037,499 A | 8/1991 | Bright et al. |
| 5,137,596 A | 8/1992 | Potter |
| 5,240,529 A | 8/1993 | Hoffman |
| 5,403,635 A | 4/1995 | Hoffman |
| 5,464,495 A | 11/1995 | Eder |
| 5,478,422 A | 12/1995 | Bright et al. |
| 5,879,496 A | 3/1999 | Bright et al. |
| 5,897,722 A | 4/1999 | Bright |
| 6,066,223 A | 5/2000 | Gomes et al. |
| 6,245,181 B1 | 6/2001 | Bright |
| 6,375,771 B1 | 4/2002 | Bright |
| 6,488,794 B1 | 12/2002 | Bright et al. |
| 2007/0169874 A1 | 7/2007 | Kontz |

OTHER PUBLICATIONS

U.S. Appl. No. 11/668,250, filed Jan. 29, 2007; Office Action dated Sep. 29, 2008 (14 pages).

U.S. Appl. No. 11/668,250, filed Jan. 29, 2007; Office Action dated Sep. 17, 2009 (12 pages).

U.S. Appl. No. 11/668,250, filed Jan. 29, 2007; Final Office Action dated Mar. 31, 2010 (18 pages).

U.S. Appl. No. 11/668,250, filed Jan. 29, 2007; Interview Summary dated Jun. 16, 2010 (3 pages).

* cited by examiner

APPARATUS FOR CONFORMING A LABEL

CROSS-REFERENCE TO RELATED APPLICATIONS

This application is a continuation of U.S. application Ser. No. 11/668,250 filed on Jan. 29, 2007, which claims priority to U.S. Provisional Application No. 60/762,854 filed on Jan. 27, 2006, the disclosures of which are hereby incorporated by reference in their entirety herein.

BACKGROUND

It is well recognized that in certain applications, heat shrink labels provide a number of distinct advantages over paper and non-shrinkable plastic labels. For example, if the label or film is to be applied to a container or article having a curved, conical, or irregular surface underlying the label, the heat-shrink label can readily be shrunk to conform to the surface anomalies of the container. This conforming capability, in turn, provides an aesthetically pleasing appearance for the labeled container.

Prior known methods of closely forming film labels wrapped around containers utilize exclusively the application of heat impinging directly upon the film label causing the label's plastic film structure to shrink until the label closely conforms to the container's contours. Prior known methods and apparatuses utilize mainly heated air, or direct infrared irradiation, to initiate and complete the shrinking process of the laminated film labels to the containers. In most applications, the film label must be heated to a temperature of at least 470° F. in order to elevate the film's temperature sufficiently so that the film label will shrink enough to conform to the contour of the container.

BRIEF DESCRIPTION OF THE DRAWINGS

It will be appreciated that the illustrated boundaries of elements (e.g., boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vice versa.

Further, in the accompanying drawings and description that follow, like parts are indicated throughout the drawings and description with the same reference numerals, respectively. The figures are not drawn to scale and the proportions of certain parts have been exaggerated for convenience of illustration.

DETAILED DESCRIPTION

This application is directed to an apparatus and method for conforming a label to the contour of a container. The apparatus and method employ a reduced amount of heat in combination with mechanical pressure to conform the label to the contour of the container ensuring a tight fit.

Figure 1:
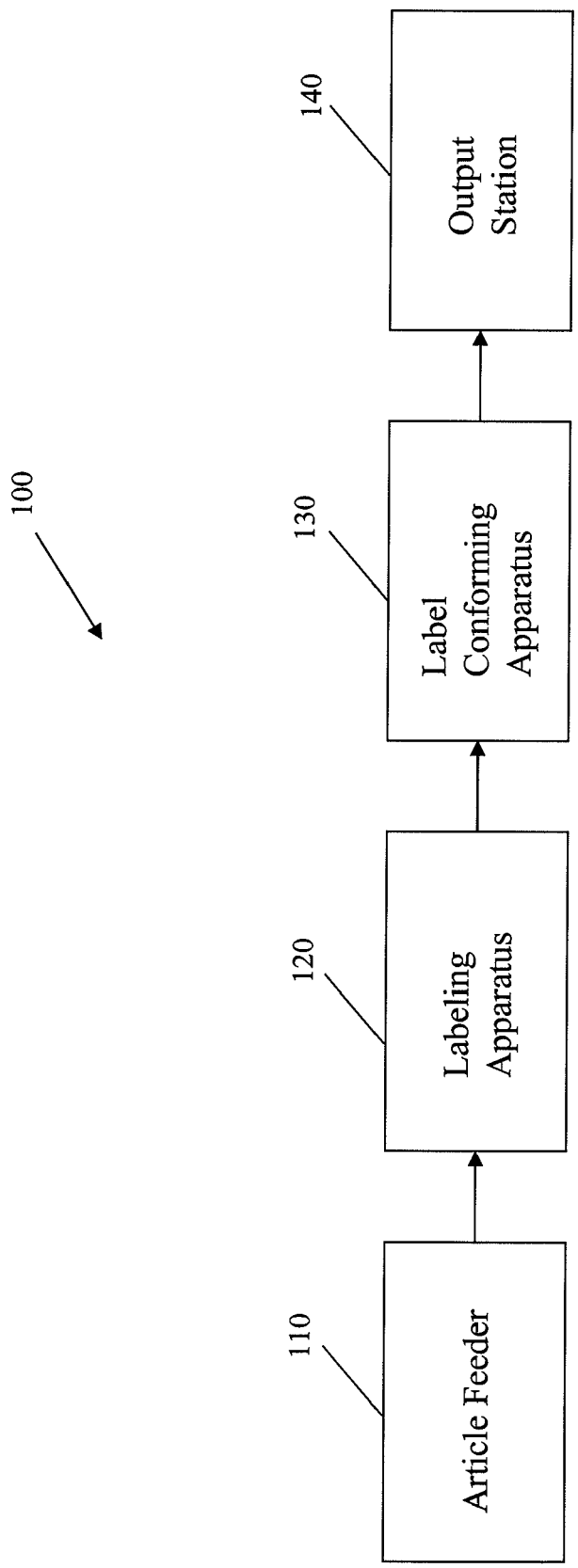
FIG. 1 illustrates a schematic of one embodiment of a conveyor system 100 for labeling containers.

Illustrated in FIG. 1 is a schematic of one embodiment of a conveyor system 100 for labeling containers. In this embodiment, the conveyor system 100 includes an article handling mechanism such as an article feeder 110. The article feeder 110 is configured to supply containers in a single file lane along a travel path to a labeling apparatus 120. The article feeder 110 can be, for example, a chain or link conveyor.

Containers that can be used in conveyor system 100 include, without limitation, aerosol containers, paint cans, beverage containers, and other liquid or dry goods containers, and may be constructed from metal, plastic, or glass. Additionally, these containers can take the form of a variety of sizes and shapes. For example, the container can include straight walls from top to bottom (e.g., a true cylindrical container). Alternatively, the containers can have a more complex or irregular shape.

Figure 2:
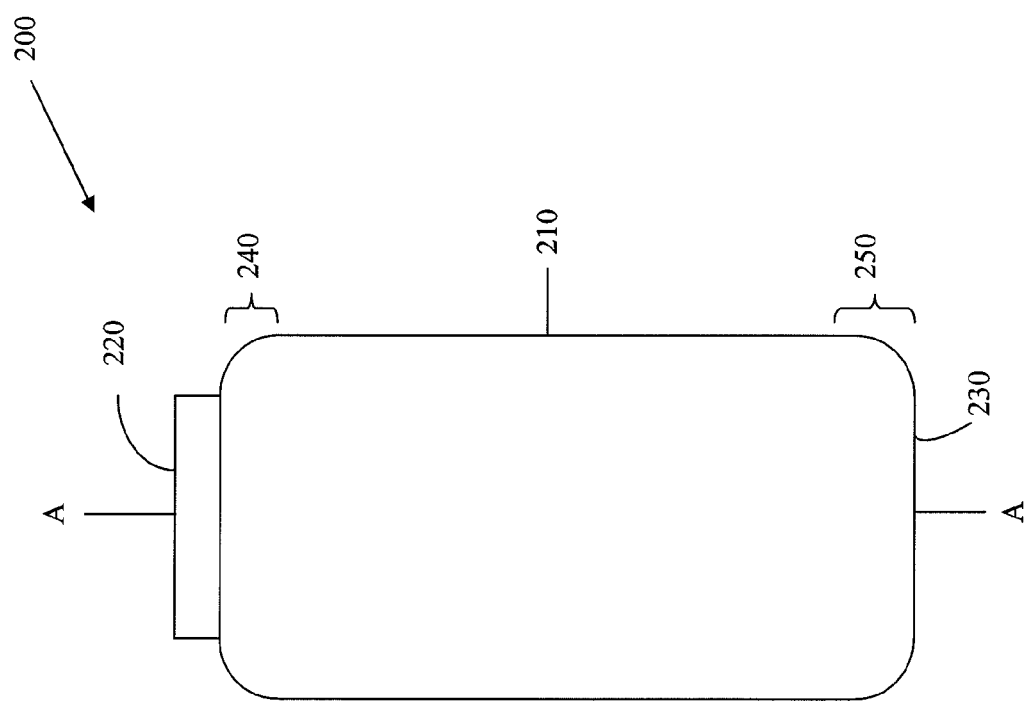
FIG. 2 illustrates a front view of one embodiment of a container 200 having an irregular shape.

Illustrated in FIG. 2 is a front view of one embodiment of a container having an irregular shape. As shown in FIG. 2, the container 200 includes a cylindrical body 210, a top 220, a bottom 230, and a longitudinal axis A. The container 200 also includes an upper contoured section 240 that curves toward the longitudinal axis A and serves as a transition between the cylindrical body 210 and the top 220, and a lower contoured section 250 that curves toward the longitudinal axis A and serves as a transition between the cylindrical body 210 and the bottom 230. Of course, it will be appreciated that the container can take the form of a variety of other shapes and sizes.

With reference back to FIG. 1, the labeling apparatus 120 is configured to apply a label to each container as it passes through the labeling apparatus 120. The film label may be a single layer film label or a multi-layer film label (e.g., a laminate film). Each layer of film may be constructed from a variety of materials such as polypropylene, polyolefin, polyethylene, polystyrene foam, or combinations thereof.

In one embodiment, the film label is a laminate film label having a base layer and an overlay layer. One suitable example of a base layer is Label-Lyte 350 LLG-202 film manufactured by Exxon-Mobil. This film is opaque white in color and made from oriented polypropylene (OPP). The base layer is 1.45 mils (37 microns) thick and has a top surface that is treated for printing. One suitable example of an overlay layer is Label-Lyte 408 LLG-112 film manufactured by Exxon-Mobil. This film is clear and made from biaxially oriented polypropylene (BOPP). The overlay layer is 0.75 mils (19 microns) thick and is pressure-sensitive for lamination over the printed Label-Lyte 350 LLG-202 base layer film.

In one embodiment, the labeling apparatus 120 is a roll-fed labeling apparatus such as the one described in U.S. Pat. No. 4,108,710, which is hereby incorporated by reference in its entirety herein. In such an apparatus, a continuous length of film material is provided in the form of a roll. It passes continuously through a cutting station where predetermined lengths are severed into individual film labels. Once severed, a vacuum on a constantly rotating vacuum drum grips the leading edge of each film label, and glue (e.g., a hot melt adhesive) is applied to the leading edge and trailing edge of each label. Alternatively, a glue line may be applied directly to the container such that the leading edge of each film label is unglued and is adhered to the container by means of the glue line on the container, and the trailing edge of each label is provided with glue and laps over the leading edge of the label on the container to form a seam. After the glue is applied to the film label and/or the container, the film label is wrapped around the container to apply it to the container.

The container can exit the labeling apparatus 120 with the label applied thereon in various configurations depending on the shape of the container to be labeled and the desired label orientation.

Figure 3:
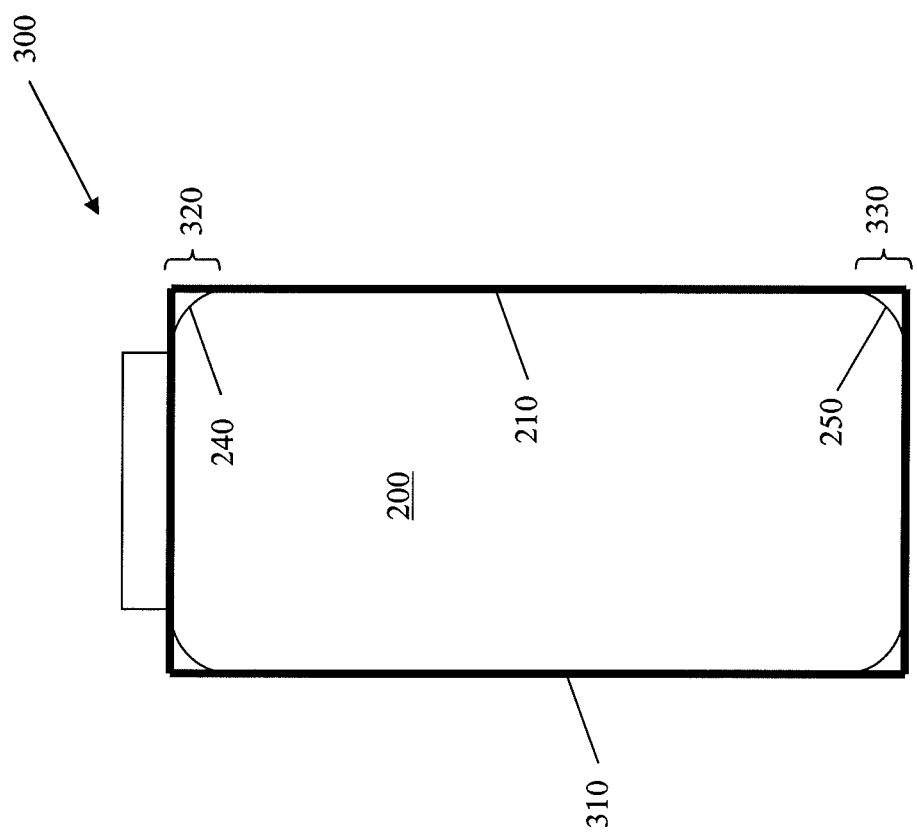
FIG. 3 illustrates a front view of one configuration of a labeled container 300 after it exits the labeling apparatus 120.

Illustrated in FIG. 3 is a front view of one configuration of a labeled container 300 after it exits the labeling apparatus 120. In this configuration, the labeled container 300 includes the container 200 illustrated in FIG. 2 and described above and a label 310 wrapped around the entire cylindrical body 210 of the container 200. The label 310 includes an upper edge portion 320 that extends above (e.g., about 3-5 mm) the cylindrical body 210 of the container 200, such that it overlaps (but does not contact) the upper contoured section 240 of the container 200, while the label 310 includes a lower edge portion 330 that extends below (e.g., about 3-5 mm) the cylindrical body 210 of the container 200, such that it overlaps (but does not contact) the lower contoured section 250 of the container 200. The upper edge portion 320 and the lower edge portion 330 will be hereinafter referred to as "upper detached edge portion 320" and "lower detached edge portion 330," respectively, because these edges of the label 310 are not in contact with the container 200 and stand freely.

In an alternative embodiment (not shown), the label may be applied to the container in such a way that it overlaps only one of the contoured sections (e.g., the upper contoured section 240 or the lower contoured section 250 of the container 200). In another alternative embodiment (not shown), if the container to be labeled has only one contoured section (i.e., the container departs from a cylindrical shape at only one end), then the label may be applied to the container in a manner such that it will overlap only the one contoured section. In yet another embodiment (not shown), if the container to be labeled does not have any contoured sections (e.g., a true cylindrical container), then the label may be applied only to the straight wall of the container. Although several configurations of a labeled container have been discussed above, in the following description and in the drawings, it will be assumed that the containers exit the labeling apparatus 120 in the configuration as illustrated in FIG. 3 and described above. These containers that exit the labeling apparatus 120 in the configuration as illustrated in FIG. 3 and described above will be hereinafter referred to as "labeled containers," "labeled containers C," or "containers C."

With reference back to FIG. 1, after the labeled containers exit the labeling apparatus 120, they are fed to a label conforming apparatus 130. The label conforming apparatus 130, which will be discussed in further detail below, is configured to conform the label to the contour of the container to ensure a tight fit thereof. More specifically, the label conforming apparatus 130 is configured to conform the upper detached edge portion 320 of the label 310 to the upper contoured section 240 of the labeled container, and the lower detached edge portion 330 of the label 310 to the lower contoured section 250 of the labeled container to ensure a tight fit of the label to the container.

After the finished containers exit the label conforming apparatus 130, they can then be advanced to an output station 140. In one embodiment, the output station 140 can include a packager for packaging the containers. For example, the containers may be packaged as 2-packs, 4-packs, 6-packs, etc. or in boxes. In alternative embodiments (not shown), the output station 140 can include other apparatuses including a palletizer, reject station, quality control checking station, or any combination thereof.

Figure 4:
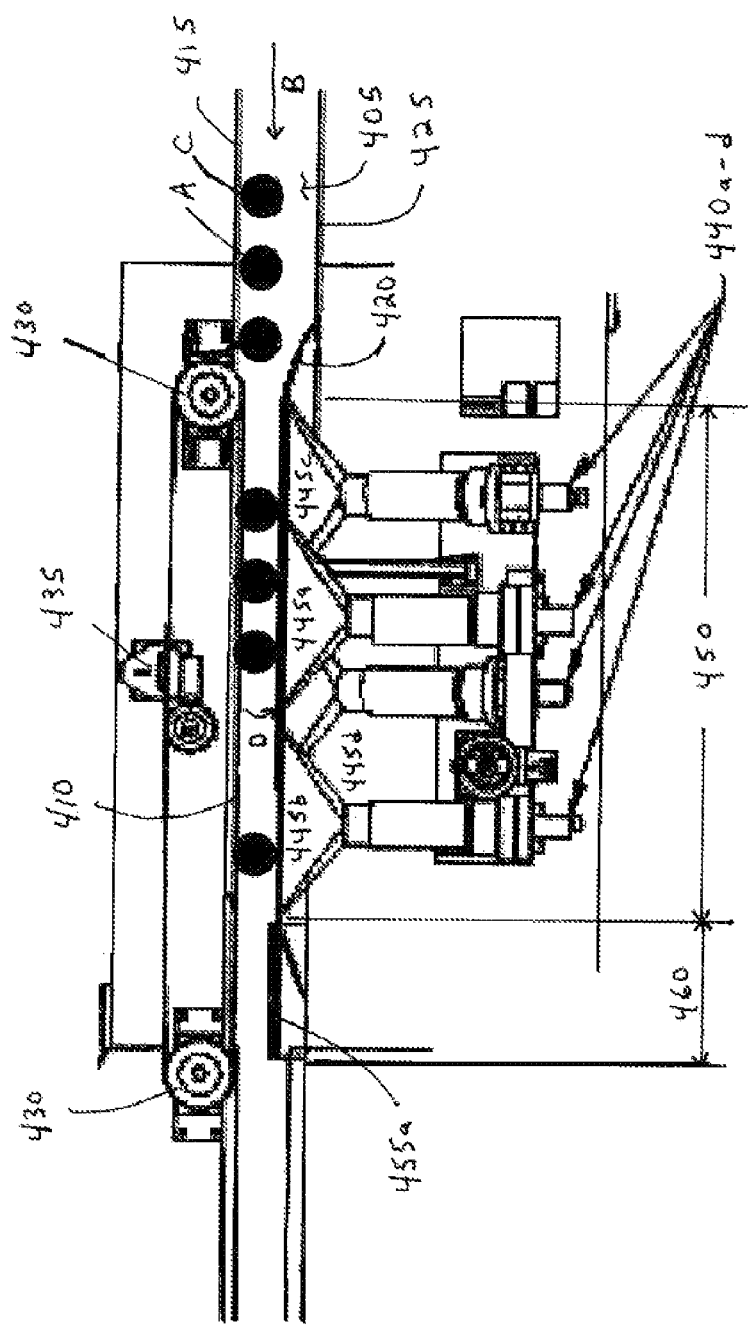
FIG. 4 illustrates a top view of one embodiment of a label conforming apparatus 400.

Illustrated in FIG. 4 is a top view of one embodiment of a label conforming apparatus 400. As discussed above, the apparatus 400 is configured to conform the upper and lower detached edge portions 320, 330 of the label 310 to the upper and lower contoured sections 240, 250, respectively, of the labeled container C to ensure a tight fit of the label to the labeled container C.

In this embodiment, the apparatus 400 includes an article carrier 405 that engages and moves labeled containers C along a travel path, represented by arrow B, in a single lane. The article carrier 405 can include, for example, a flat, segmented tabletop chain conveyor. In alternative embodiments (not shown), other types of article carriers may be used instead of a flat, segmented tabletop chain conveyor such as an endless belt conveyor, an air conveyor or a roller conveyor.

With continued reference to FIG. 4, the label conforming apparatus 400 includes a rotation mechanism configured to rotate each labeled container C about its longitudinal axis A. In the illustrated embodiment, the rotation mechanism includes a movable belt 410 positioned along a first edge 415 of the article carrier 405 and a compression plate 420 positioned along the second edge 425 of the article carrier 405 opposite the movable belt 410. As shown in FIG. 4, the movable belt 410 is a vertically oriented, endless belt that travels about two spaced-apart rotatable drums 430, each of which rotates about an axis of rotation R that is oriented at an angle perpendicular to the article carrier 405. A motor 435 or other driving mechanism can drive the movable belt 410.

The movable belt 410 and the compression plate 420 work in conjunction with each other to cause each labeled container C to rotate about its longitudinal axis A as it moves along the container travel path B. Individually, the movable belt 410 is configured to travel in the same direction as the container travel path B. However, in combination, the movable belt 410 and the compression plate 420 together cause each labeled container C to rotate about its longitudinal axis A in a counterclockwise direction as represented by arrow D. More specifically, as the labeled containers C travel through the apparatus 400, the movable belt 410 engages the labeled containers C and presses them against the compression plate 420. The combination of forces acting upon each labeled container C (i.e., the force caused by the movable belt 410 and the force imparted by the compression plate 420) causes each labeled container C to rotate about its longitudinal axis A in the counterclockwise direction D. Of course, it will be appreciated that if the direction of the container travel path B was the opposite direction, then the labeled containers C would rotation in a clockwise direction.

Although the rotation mechanism discussed above includes a movable belt in combination with an opposing compression plate, it will be appreciated that any conventional rotation mechanism may be employed to rotate each labeled container C as it moves along the container travel path B. By way of example, an alternative rotation mechanism may include the same movable belt discussed above, but instead of being used in combination with an opposing compression plate, it can be used in combination with an opposing movable belt traveling in an opposite direction.

With continued reference to FIG. 4, the label conforming apparatus 400 also includes one or more heat sources configured to heat the label 310 on the labeled container C to a sufficient temperature to achieve a sufficient degree of plasticity to render the label pliable. More specifically, the apparatus 400 includes one or more heat sources configured to heat the upper and lower detached edge portions 320, 330 of the label 310 to a sufficient temperature to achieve a sufficient degree of plasticity to render the label pliable.

In one embodiment, the sufficient temperature to achieve plasticity of the label 310 is between the range of about 95° F. and about 165° F. This temperature range is significantly below the temperatures required in conventional heat shrinking processes, which require heated air in excess of 470° F. to be impinged upon the label in order to shrink the label to conform to the contour of the container.

In the illustrated embodiment, the heat sources include four hot air blowers 440a-d positioned along the second edge 425 of the article carrier 405. To direct and focus the heated air along a certain air path, nozzles 445a-d are connected to the hot air blowers 440a-d, respectively, and positioned adjacent to the compression plate 420 along the second edge 425 of the article carrier 405. In this embodiment, each nozzle 445 has a substantially rectangular exit opening that directs the heated air along a substantially rectangular path. In alternative embodiments (not shown), one or more of the nozzles can have an exit opening with a different shape.

The hot air blowers discussed above can be an integrated unit (e.g., a heater and blower packaged together in one unit) or a combination of two separate components (e.g., a heater and a blower that can be married together at the time of installation). One suitable example of a separate heater is a Hot Air Tool 5000 heater manufactured by Leister Process Technologies, Sarnan, Switzerland, which is rated at 8,000 watts and is capable of achieving a maximum temperature of 700° C. One suitable example of a separate blower is a medium pressure blower such as the Leister ASO blower manufactured by Leister Process Technologies, Sarnan, Switzerland, which has a pressure rated at 2400 Pascals and is capable of achieving a delivery volume of 15,900 l/min. Of course, other types of hot air blowers can be used. Additionally, other types of heaters can be used instead of hot air blowers such as direct infrared heaters or steam heaters.

Figure 5:
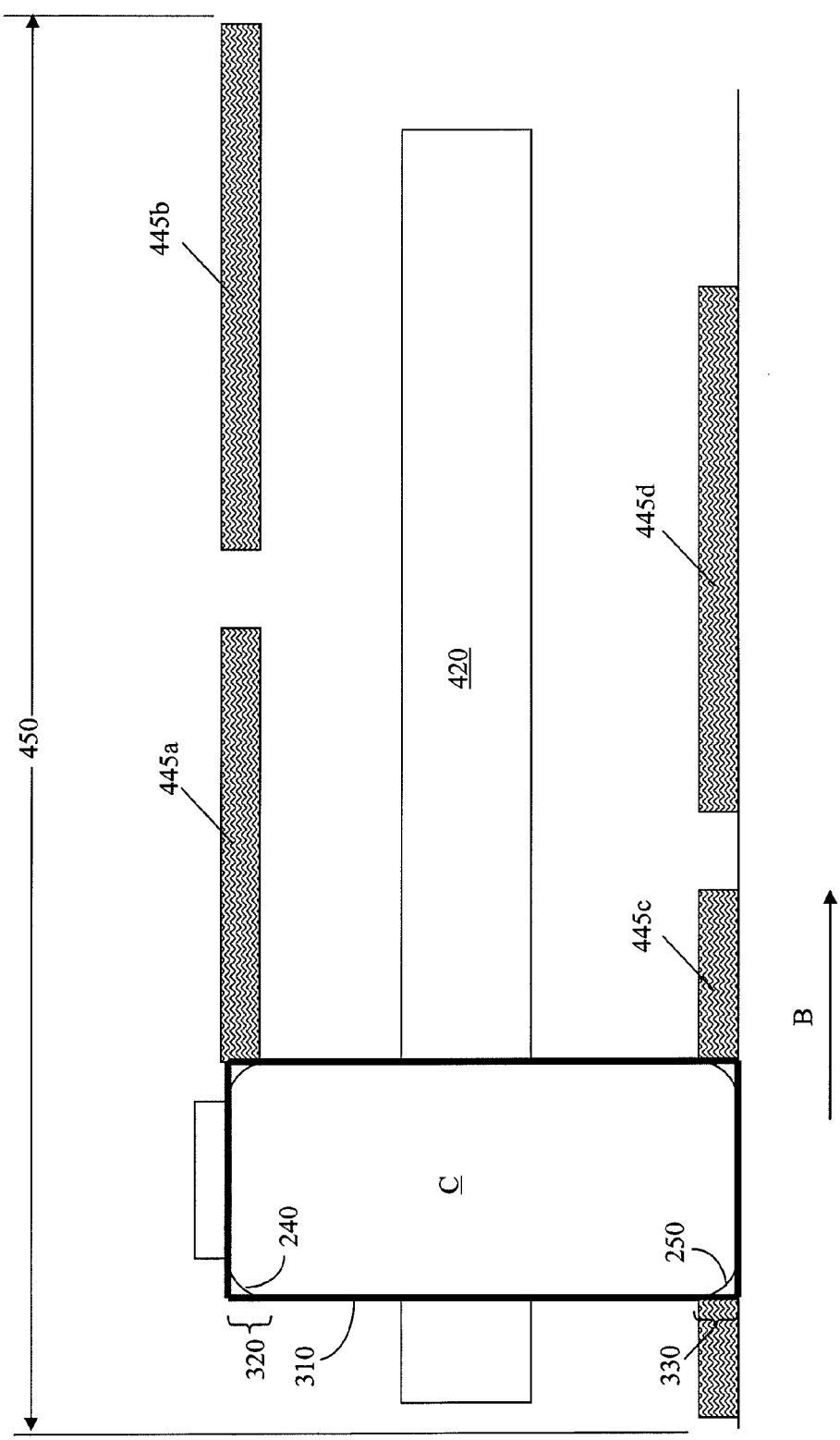
FIG. 5 illustrates a side view of a labeled container C as it travels along the container travel path B in front of two of the hot air blowing nozzles 445 of the label conforming apparatus 400.

Illustrated in FIG. 5 is a view of a labeled container C as it travels along the container travel path B in front of two of the hot air blowing nozzles 445 of the label conforming apparatus 400. As shown in FIG. 5, the nozzles 445a-d are arranged in two side-by-side pairs adjacent to the compression plate 420. Specifically, one of the two pairs of nozzles (i.e., nozzles 445a,b) is positioned above the compression plate 420 to focus the heated air at the upper detached edge portion 320 of the labeled container C, while the other pair of nozzles (i.e., nozzles 445c,d) is positioned below the compression plate 420 to focus the heated air at the lower detached edge portion 330 of the labeled container C. In the illustrated embodiment, the two pairs of nozzles 445 are staggered or offset from each other, such that they are not vertically aligned. For example, the nozzle 445a is not vertically aligned with the nozzle 445c. In an alternative embodiment (not shown), the two pairs of nozzles 445 can be vertically aligned. In other embodiments (not shown), one or both pairs of side-by-side nozzles can be replaced with a single nozzle that has substantially the same length as the two side-by-side nozzles. Alternatively, three or more side-by-side nozzles can be used above or below the compression plate 420.

With continued reference to FIG. 5, the distance between the furthest upstream end of the lower nozzle (i.e., nozzle 445c) and the furthest downstream end of the upper nozzle (i.e., nozzle 445b) is defined as a heating zone 450. Thus, as the labeled containers C enter the heating zone 450 of the label conforming apparatus 400, heating of the upper and lower detached edges 320, 330 of the labeled containers C is initiated. Once the labeled containers C complete their travel through the heating zone 450, the upper and lower detached edges 320, 330 of the labeled containers C should be heated to the temperature range of between about 95° F. and about 165° F.

In one embodiment, each labeled container C is rotated three times via the rotation mechanism during its travel through the heating zone 450 of the label conforming apparatus 400 in order to heat the upper and lower detached edge 320, 330 of the label 310 to the sufficient temperature. However, in alternative embodiments, the label conforming apparatus 400 can be configured to rotate each labeled container C less than three times or more than three times as it travels through the label conforming apparatus 400. To accomplish this, the length of the heating zone 450 (e.g., the length and/or spacing of the hot air blowing nozzles 445a-d) can be adjusted and/or the speed of the movable belt 410 can be varied.

With reference back to FIG. 4, the label conforming apparatus 400 further includes a mechanical force applicator positioned along the second edge 425 of the article carrier 405 downstream from the heating zone 450. The mechanical force applicator is configured to apply mechanical pressure to the heated label to force it to conform to the contour of the labeled container C. More specifically, the mechanical force applicator is configured to apply mechanical pressure to the upper and lower detached edge portions 320, 330 of the heated label 310 to conform these edges to the upper and lower contoured sections, 240, 250, respectively, of the container C. In the illustrated embodiment, the mechanical force applicator includes two linear brushes—an upper linear brush 455a and a lower linear brush 455b (not shown in FIG. 4) that are utilized to apply mechanical forces to the upper and lower detached edge portions 320, 330 of the heated label 310.

In one embodiment, the primary bristles of the linear brushes are horsehair, which are captured and held in a rigid supporting metallic structure. One suitable example of a linear horsehair brush is supplied by McMaster-Carr Corporation. This linear horsehair brush includes horsehair bristles that are 0.008 inches in diameter and 1.0 inch in length, which are captured in a stainless steel base that is 5/16 inches thick at the base and one foot in length. In alternative embodiments, the linear brushes may be replaced with one or more linear pads made from a sufficiently compliant material that is capable of applying the necessary pressure to force the upper and lower detached edges of the label against the container such that it conforms to the contour of the container. Exemplary materials include, without limitation, foam (closed cell or open cell), felt, carpet strips, coarse fibers, and the like. Generally, any material may be used so long as it has a sufficient amount of compliance necessary to conform the detached edges of the label to the contoured sections of the container and has the ability to withstand temperatures of at least 100° F. In other alternative embodiments, the linear brushes may be replaced with one or more rotary brushes (e.g., foam roller covers) that can have an outer profile that matches the contour of the curved section of the container.

Figure 6:
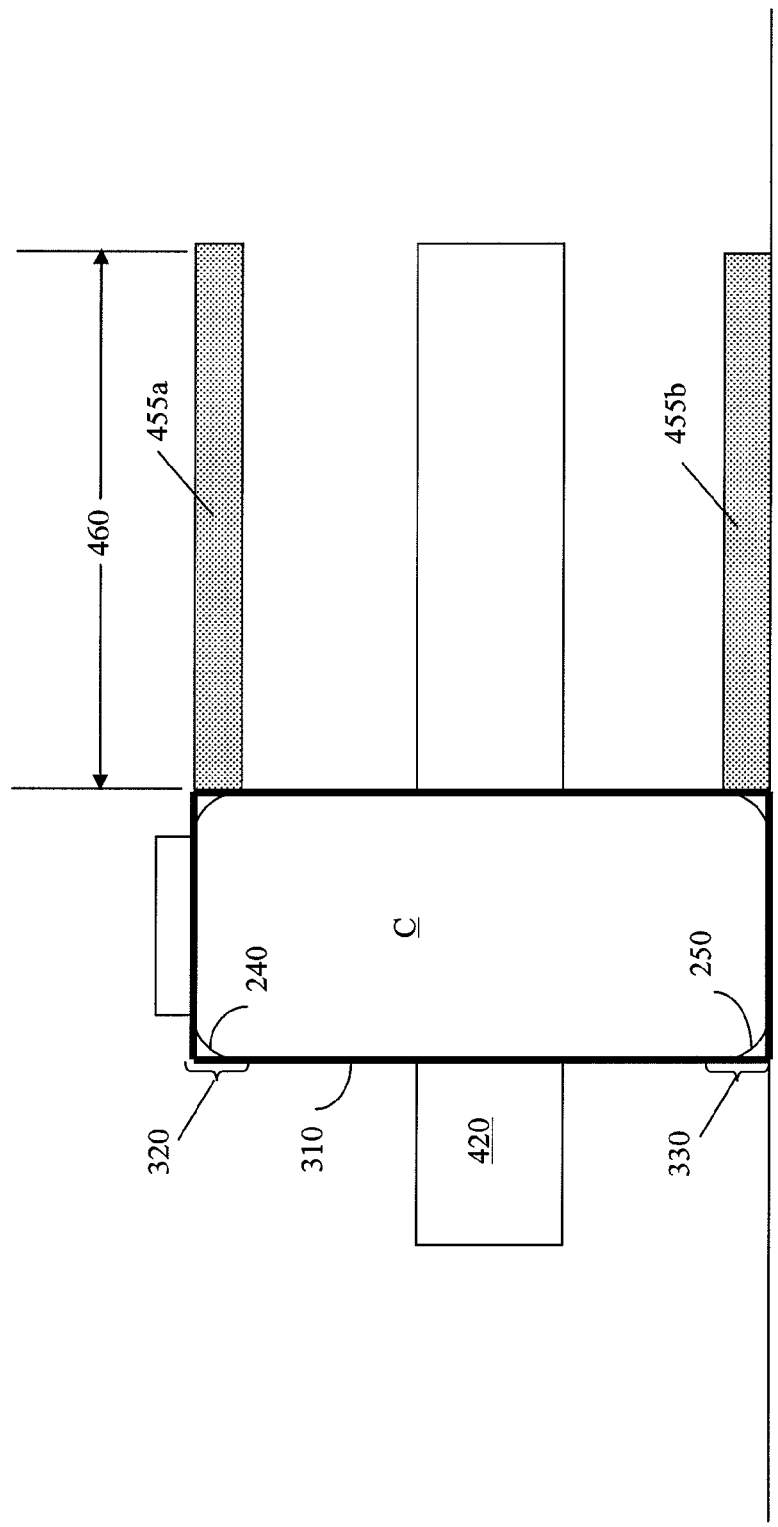
FIG. 6 illustrates a side view of a labeled container C as it travels along the container travel path B through the linear brushes 455a,b of the label conforming apparatus 400.

Illustrated in FIG. 6 is a view of a labeled container C as it travels along the container travel path B through the linear brushes 455a,b of the label conforming apparatus 400. As shown in FIG. 6, the upper linear brush 455a is positioned above the compression plate 420 and configured to apply sufficient pressure to the heated upper detached edge portion 320 of the label 310 to conform it to the upper contoured section 240 of the container C resulting in a tight fit. Similarly, the lower linear brush 455b is positioned below the compression plate 420 and configured to apply sufficient pressure to the heated lower detached edge portion 330 of the label 310 to conform it to the upper contoured section 250 of the container C resulting in a tight fit. As shown in FIG. 6, the upper and lower linear brushes 455a,b are vertically aligned with each other. In an alternative embodiment (not shown), the upper and lower linear brushes 455a,b may be staggered or offset from each other.

Figure 7:
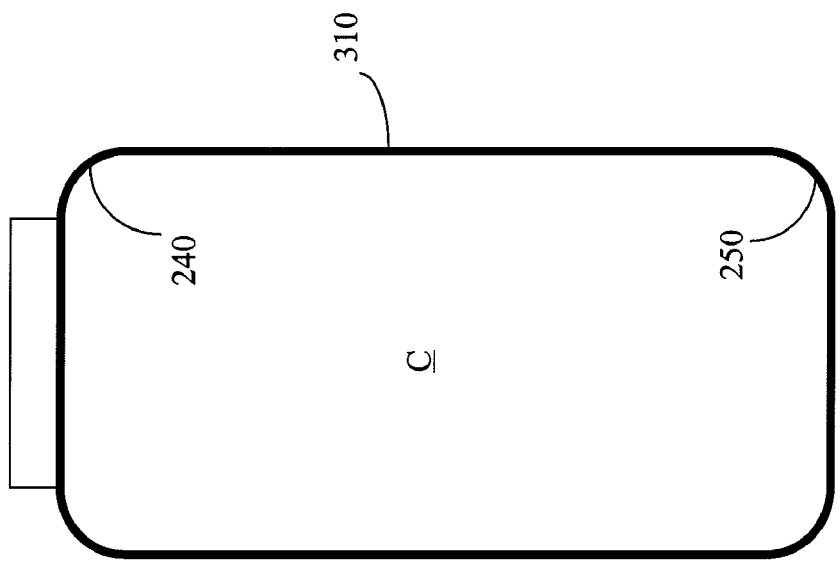
FIG. 7 illustrates a front view of one configuration of a finished container C after it exits the label conforming apparatus 400.

With continued reference to FIG. 6, the distance between the upstream and downstream ends of the upper and lower linear brushes 455a,b is defined as a mechanical pressure applying zone 460. Thus, as the labeled container C enters the mechanical pressure applying zone 460 of the label conforming apparatus 400, the upper and lower linear brushes 455a,b begin to apply pressure to the heated upper and lower detached edge portions 320, 330, respectively, to conform these edges to the upper and lower contoured sections 240, 250, respectively, of the container C. Once the labeled container C completes its travel through the mechanical pressure applying zone 460, the upper and lower detached edge portions 320, 330 of the labeled container C are conformed to the upper and lower contoured sections 240, 250, respectively, of the container C as shown in FIG. 7.

In one embodiment, each labeled container C is rotated one and one half times via the rotation mechanism as it travels through the mechanical pressure applying zone 460 of the label conforming apparatus 400 in order to conform the heated upper and lower detached edge 320, 330 of the label 310 to the upper and lower contoured sections 240, 250, respectively, of the container C. However, in alternative embodiments, the label conforming apparatus 400 can be configured to rotate each container less than one and one half times or more than one and one half times while it travels through the mechanical pressure applying zone 460 of the label conforming apparatus 400. To accomplish this, the length of the mechanical pressure applying zone 460 (e.g., the length of the linear brushes 455a,b) can be adjusted and/or the speed of the movable belt 410 can be varied.

After the mechanical pressure is applied to the upper and lower detached edges of the label to conform them to the upper and lower contoured sections of the container, the finished containers enter a continuous conveyor (not shown) of sufficient length to provide an ample amount of ambient cooling before being subjected to subsequent processes. For example, the total length of the continuous conveyor can be 200 linear feet to provide at least two minutes of ambient cooling. Of course, the length and/or the operation speed of the conveyor can be adjusted to provide more or less ambient cooling. Furthermore, it will be appreciated that the finished containers may be cooled by another cooling process such as an active cooling process.

In alternative embodiments (not shown), the heat sources and mechanical force applicators discussed above may be directed at only one portion of the labeled container. For example, if the labeled container only has one contoured section, then the label conforming apparatus may include one or more heat sources and one or more mechanical force applicators directed to the lone contoured section. In another example, the label conforming apparatus may include one or more heat sources and one or more mechanical force applicators directed to one or more portions of the labeled container even though the labeled container lacks a detached edge. In this case, the application of heat and mechanical force to the labeled container assists in providing a tight fit of the label to the container.

Furthermore, it will be appreciated that a labeled container may still be used in the apparatus 400 discussed above even though it lacks a detached edge. If this is the case, the application of heat and mechanical force to the upper and lower portions of the container assists in providing a tighter fit of the label to the container.

Figure 8:
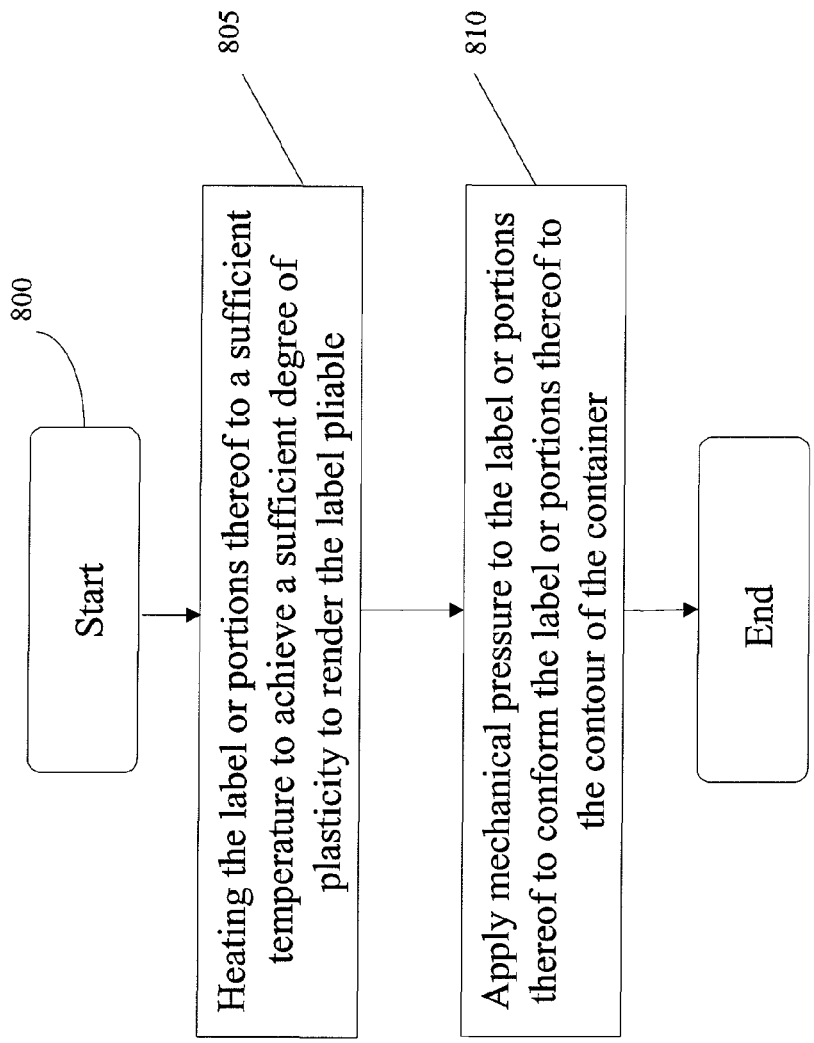
FIG. 8 illustrates one embodiment of a methodology for conforming a label to the contour of a container.

Illustrated in FIG. 8 is one embodiment of a methodology associated with conforming a label to the contour of a container. The illustrated elements denote "processing blocks" and represent functions and/or actions taken for conforming a label to the contour of a container. In one embodiment, the processing blocks may represent computer software instructions or groups of instructions that cause a computer or processor to perform an action(s) and/or to make decisions that control another device or machine to perform the processing. It will be appreciated that the methodology may involve dynamic and flexible processes such that the illustrated blocks can be performed in other sequences different than the one shown and/or blocks may be combined or, separated into multiple components. The foregoing applies to all methodologies described herein.

With reference to FIG. 8, the process 800 involves a process for conforming a label to the contour of a container. The process 400 includes heating the label or portions thereof (e.g., the detached edge portions 320, 330 of the label 310 discussed above) to a sufficient temperature to achieve a sufficient degree of plasticity to render the label pliable (block 805). In one embodiment, the label or portions thereof are heated to a temperature between about 95° F. and about 165° F. After the label or portions thereof are heated to the sufficient temperature, the process further includes applying mechanical pressure to the label or portions thereof (e.g., the detached edge portions 320, 330 of the label 310 discussed above) to conform the label or portions thereof to the contour of the container (e.g., the upper and lower contoured sections 240, 250 of the container C discussed above) (block 810).

The label conforming apparatus 400 and methodology 800 described above have several potential advantages. One advantage is that it can eliminate defects in the labeling process (which includes label applying and conforming) due to overheating such as distortion or wrinkling. A second potential advantage is that a broader range of label materials may be employed (e.g., thinner film labels) since the dependence upon the shrinkage characteristics of film label materials is reduced. A third potential advantage is that many of the critical closely controlled process requirements of the known prior methods, such as precisely heated air temperature process control and dynamic dwell timing control, can be eliminated. The reduction of these critical process control factors allows for an improvement in both the subjective appearance and quality of the finished labeled containers, as well as providing the opportunity for improved process yields and efficiencies. A fourth potential advantage is that there is a significant advantage in terms of reduced energy consumption due to the reduced label-heating requirement. A final potential advantage is that current heat shrinking equipment can be retrofitted to accommodate the process described above. For example, existing hot air blowers can be utilized without the need to update or change controllers. However, the hot air blowers can be operated at reduced power (e.g., twenty percent (20%) of their maximum output rating), thereby reducing energy consumption as discussed above.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's claimed invention.

What is claimed is:

1. A label conforming apparatus for conforming a detached edge portion of a heat shrink label to a contoured section of a container, the heat shrink label being pre-applied to the container by a labeling apparatus, the label conforming apparatus comprising:
   a conveyor configured to move the container along a travel path;
   a heat source positioned along the conveyor downstream from the labeling apparatus, the heat source configured to heat at least the detached edge portion of the pre-applied, heat shrink label to a temperature between 95° F. and 165° F. as the container moves along the travel path;
   a mechanical pressure applicator configured to apply pressure to at least the heated detached edge portion of the label to conform it to the contoured section of the container as the container moves along the travel path, the mechanical pressure applicator including:
      at least two rotatable drums, including at least a first rotatable drum and a second rotatable drum, each positioned along the conveyor downstream from the labeling apparatus,
      a vertically oriented belt disposed about the at least two rotatable drums and positioned along a first edge of the conveyor,
      a compression plate positioned along a second edge of the conveyor, opposite the vertically oriented belt, and
      at least two linear brushes, including a first linear brush and a second linear brush, held in a rigid supporting structure and positioned along the second edge of the conveyor, wherein the first linear brush is vertically spaced from the second linear brush, the compression plate being in between the first and second spaced linear brushes;
   wherein the heat source is positioned downstream of the first rotatable drum upstream of the second rotatable drum of the mechanical pressure applicator, such that the heat source applies heat to the heat shrink label concurrently with the compression plate applying pressure to the heat shrink label.

2. The label conforming apparatus of claim 1, wherein the mechanical pressure applicator is configured to rotate the container as it passes in front of the heat source and the compression plate.

3. The label conforming apparatus of claim 1, wherein the conveyor includes a flat, segmented chain conveyor.

4. The label conforming apparatus of claim 1, wherein the heat source includes at least one hot air blower connected to a nozzle positioned along the second edge of the conveyor, the nozzle configured to focus the heat on the detached edge portions of the label.

5. The label conforming apparatus of claim 1, wherein the vertically oriented belt is configured to move in the same direction as the travel path of the container.

6. The label conforming apparatus of claim 1, wherein the vertically oriented belt is positioned a sufficient distance away from the compression plate such that the vertically oriented belt is capable of engaging the container as it travels along the travel path and pressing it against the compression plate, thereby causing the container to rotate about its longitudinal axis.

7. The label conforming apparatus of claim 1, wherein the first linear brush is positioned to apply pressure to a top edge portion of the pre-applied, heat shrink label and the second linear brush is positioned to apply pressure to a bottom edge portion of the pre-applied, heat shrink label.

8. A label conforming apparatus for conforming a heat shrink label to the contour of a container, the heat shrink label being pre-applied to the container by a labeling apparatus, the label conforming apparatus comprising:
   a conveyor configured to move the container along a travel path;
   a heat source positioned along the conveyor downstream from the labeling apparatus, the heat source configured to heat at least a portion of the pre-applied, heat shrink label to a sufficient temperature to achieve a sufficient degree of plasticity as the container moves along the travel path;
   a mechanical pressure applicator configured to apply pressure to at least a portion of the heated label to conform it to the contour of the container as the container moves along the travel path, the mechanical pressure applicator including:
      at least two rotatable drums, including at least a first rotatable drum and a second rotatable drum, each positioned along the conveyor downstream from the labeling apparatus,
      a vertically oriented belt disposed about the at least two rotatable drums and positioned along a first edge of the conveyor,
      at least a pair of linear brushes held in a rigid supporting structure, including a first linear brush held in a rigid supporting structure and a second linear brush vertically spaced from the first linear brush and held in a rigid supporting structure, each positioned opposite the vertically oriented belt, and
      a compression plate positioned opposite the vertically oriented belt and in between the first linear brush and the second linear brush,
   wherein the first linear brush is positioned to apply pressure to a top edge portion of the pre-applied, heat shrink label and the second linear brush is positioned to apply pressure to a bottom edge portion of the pre-applied, heat shrink label;

wherein the heat source is positioned downstream of the first rotatable drum and upstream of the second rotatable drum of the mechanical pressure applicator.

9. The label conforming apparatus of claim 8, wherein the mechanical pressure applicator is configured to rotate the container as it passes in front of the heat source.

10. The label conforming apparatus of claim 8, wherein the conveyor includes a flat, segmented chain conveyor having a second edge opposite the first edge.

11. The label conforming apparatus of claim 10, wherein the heat source includes at least one hot air blower connected to a nozzle positioned along the second edge of the conveyor, the nozzle configured to focus the heat on the label.

12. The label conforming apparatus of claim 8, wherein the heat source is configured to heat at least a portion of the label to a temperature between about 95° F. to about 165° F.

13. The label conforming apparatus of claim 8, wherein the first linear brush is positioned to apply pressure to a top edge portion of the pre-applied, heat shrink label and the second linear brush is positioned to apply pressure to a bottom edge portion of the pre-applied, heat shrink label.

14. A system for labeling a container, the system comprising:
a conveyor configured to move the container along a travel path;
a labeling apparatus positioned along the conveyor and configured to apply a label to the container; and
a label conforming apparatus positioned along the conveyor downstream from the labeling apparatus and configured to conform the label to the contour of the container, the label conforming apparatus including:
a heat source configured to heat at least a portion of the label to a temperature between about 95° F. to about 165° F. as the container moves along the travel path, and
a mechanical pressure applicator configured to apply pressure to at least a portion of the heated label to conform it to the contour of the container as the container moves along the travel path, the mechanical pressure applicator including a compression plate, at least two brushes held in a rigid supporting structure, and at least two rotatable drums, including at least a first rotatable drum and a second rotatable drum,
wherein the at least two brushes includes a first brush is vertically spaced from a second brush,
wherein the compression plate is positioned vertically between the first brush and the second brush, and
wherein the heat source is positioned downstream of the first rotatable drum and upstream of the second rotatable drum of the mechanical pressure applicator.

15. The system of claim 14, wherein the mechanical pressure applicator is configured to rotate the container as it passes in front of the heat source and the mechanical pressure applicator.

16. The system of claim 15, wherein the conveyor includes a flat, segmented chain conveyor having a first edge and a second edge opposite the first edge.

17. The system of claim 16, wherein the mechanical pressure applicator further includes a vertically oriented belt positioned along the first edge of the conveyor and disposed about the at least two rotatable drums, the belt configured to move in the same direction as the travel path of the container.

18. The system of claim 17, wherein the heat source includes at least one hot air blower having a nozzle positioned along the second edge of the conveyor, the nozzle configured to focus the heat on at least a portion of the label.

19. The system of claim 17, wherein the at least two brushes and the compression plate are positioned opposite the vertically oriented belt.

20. The system of claim 17, wherein the first brush is positioned to apply pressure to a top edge portion of the label and the second brush is positioned to apply pressure to a bottom edge portion of the label.

* * * * *